(12) United States Patent
Barta et al.

(10) Patent No.: US 7,240,754 B2
(45) Date of Patent: Jul. 10, 2007

(54) TRUCK CAB SUSPENSION CONTROL

(75) Inventors: David J. Barta, Beavercreek, OH (US); William C. Kruckemeyer, Beavercreek, OH (US); Todd A. Bishop, Dayton, OH (US); Stephan A. Lubbers, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 399 days.

(21) Appl. No.: 10/866,955

(22) Filed: Jun. 14, 2004

(65) Prior Publication Data
US 2005/0274557 A1    Dec. 15, 2005

(51) Int. Cl.
B60D 33/006    (2006.01)
B62D 33/01     (2006.01)

(52) U.S. Cl. .................. 180/89.12; 280/5.507; 296/190.07

(58) Field of Classification Search .......... 180/89.12; 296/190.07; 280/5.507, 5.513
See application file for complete search history.

(56) References Cited

U.S. PATENT DOCUMENTS

| | | | | |
|---|---|---|---|---|
| 5,044,455 A | * | 9/1991 | Tecco et al. ............. | 180/89.13 |
| 5,488,556 A | * | 1/1996 | Sasaki ..................... | 701/37 |
| 5,623,410 A | * | 4/1997 | Furihata et al. .......... | 701/37 |
| 5,899,288 A | * | 5/1999 | Schubert et al. ......... | 180/89.12 |
| 5,941,920 A | * | 8/1999 | Schubert .................. | 701/37 |
| 6,000,703 A | * | 12/1999 | Schubert et al. ......... | 280/5.518 |
| 6,026,339 A | * | 2/2000 | Williams .................. | 701/37 |
| 6,029,764 A | * | 2/2000 | Schubert .................. | 180/89.13 |
| 6,070,681 A | * | 6/2000 | Catanzarite et al. ..... | 180/89.15 |
| 6,073,066 A | * | 6/2000 | Takahashi ................ | 701/37 |

* cited by examiner

Primary Examiner—Paul N. Dickson
Assistant Examiner—Timothy Wilhelm
(74) Attorney, Agent, or Firm—Scott A. McBain

(57) ABSTRACT

A suspension system having a frame, a cab having a front portion pivotally mounted to the frame and at least one actuator mounted between a rear portion of the cab and the frame. A position sensor is mounted adjacent the rear portion of the cab for generating a first signal indicating a position of the cab relative to the frame, an accelerometer is mounted to the frame for generating a second signal indicating an acceleration of the frame relative to gravity and an electronic control receives the first and second signals from the position sensor and the accelerometer and generates a control signal for controlling the actuator in response to the first and second signals.

6 Claims, 2 Drawing Sheets

TRUCK CAB SUSPENSION CONTROL

BACKGROUND

The present invention relates to suspension control systems and, more particularly, to truck cab suspension control systems utilizing semi-active actuators for controlling motion of a truck cab relative to a truck frame.

Truck cabs typically are built separately from, and later mounted on, a truck frame. Because the cab is separate from the frame, movement of the frame may be transmitted through and amplified by the connections between the cab and the frame. Previous attempts to control the undesired movement of a truck cab relative to the frame of the truck have included the use of spring and hydraulic suspension dampers. However, such suspension dampers allow relatively large movement of the truck cab relative to the frame on which it is mounted. Accordingly, there is a need for a truck cab suspension control system that minimizes the movement of the truck cab relative to the truck frame.

SUMMARY

The present invention provides a system and method that utilizes multiple sensors that provide inputs to a control unit that manipulates semi-active actuators to control the movement of a truck cab relative to a truck frame. An advantage of the present invention is that it provides improved accuracy of control through the use of multiple sensors as inputs to an electronic control unit. The sensors provide information to the electronic control unit such that a control signal may be generated for optimum control between the truck cab and the truck frame.

In a first embodiment of the present invention, a suspension system includes a frame, a cab having a front portion pivotally mounted to the frame and at least one actuator mounted between a rear portion of the cab and the frame. The suspension system further includes a position sensor mounted near the rear portion of the cab for generating a first signal indicating a position of the cab relative to the frame, an accelerometer mounted to the frame for generating a second signal indicating an acceleration of the frame relative to gravity and an electronic control unit for receiving the first and second signals from the position sensor and the accelerometer and generating a control signal for controlling the actuator in response to the first and second signals. The actuator performs according to the control signal sent by the electronic control unit.

In a second embodiment of the present invention, a method for improving the damping performance of a suspension system includes providing a frame pivotally mounted to a cab and at least one controlled actuator between the rear portion of the cab and the frame for controlling movement of the rear portion of the cab relative to the frame, the controlled actuator being controlled by a first control signal based on a first velocity signal. Further, a sensor is provided for measuring movement of the front portion of the cab relative to the frame and generates a movement signal. Further, the movement signal is converted into a second velocity signal and a second control signal is generated based on the second velocity signal. Then, an electronic control unit determines whether the first velocity signal is in phase with the second velocity signal such that the first control signal is either increased or decreased by the second control signal based on whether the first velocity signal is in phase with the second velocity signal.

Other features, objects and advantages of the present invention will become apparent to those with ordinary skill in the art in view of the following drawings, detailed description and the appended claims. It is intended that all such additional features, objects and advantages be included herein within the scope of the present invention. Any statements and examples provided herein are intended as illustrative and should not be construed to limit the scope of the present invention.

DETAILED DESCRIPTION

Figure 1:
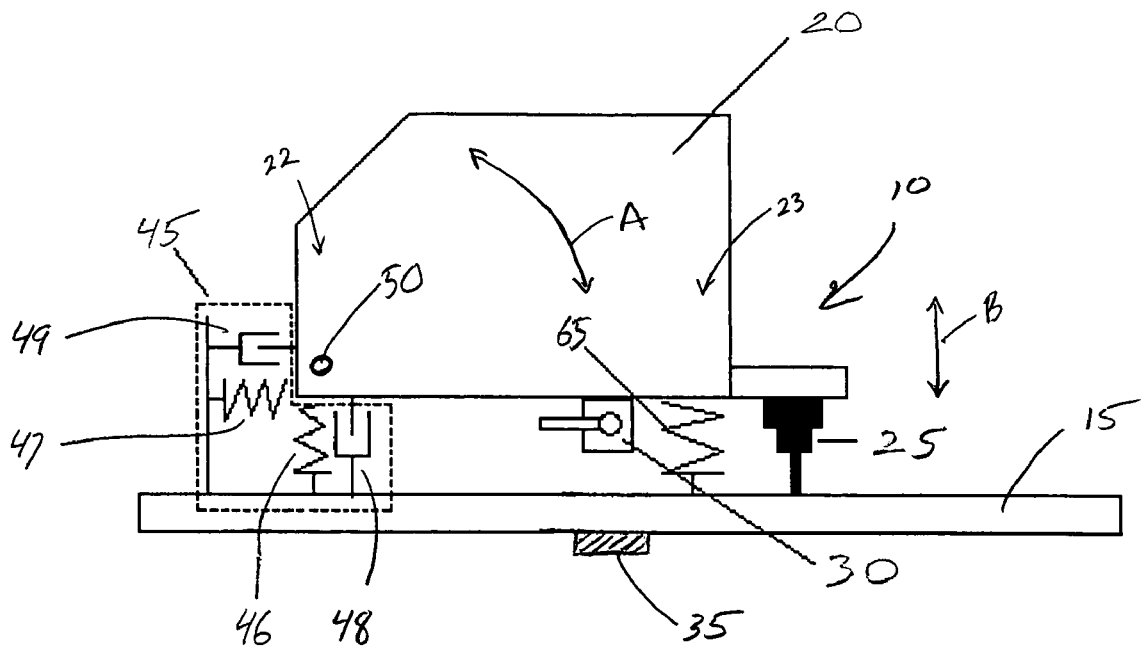
FIG. 1 is a schematic, side elevational view of a first embodiment of the suspension control system of the present invention.
Figure 2:
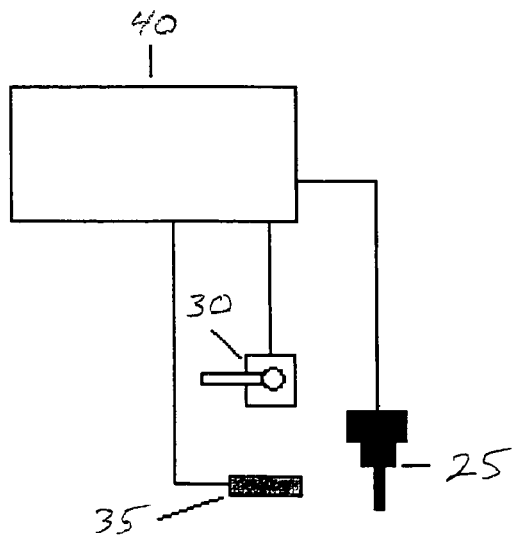
FIG. 2 is a logical schematic of the suspension control system of FIG. 1.

As shown in FIGS. 1 and 2, a first embodiment of the truck cab suspension system, generally designated 10, includes a frame 15, a truck cab 20, two actuators 25 (only one shown), a position sensor 30, an accelerometer 35 and an electronic control unit 40.

The truck cab 20 includes a front portion 22 and a rear portion 23. The front portion 22 is pivotally mounted to the frame 15 by a mounting assembly 45. The mounting assembly 45 is positioned along the front portion 22 of the cab 20 and includes two sets of vertical springs 46, two sets of horizontal springs 47, two sets of vertical dampers 48 and two sets of horizontal dampers 49. The mounting assembly 45 connects to the cab 20 at a pivot point 50 such that the cab 20 may pivot about the pivot point 50 in the direction of arrow A in FIG. 1. Additional springs 46, 47 and dampers 48, 49 may be positioned along the front portion 22 of the cab 20 to provide additional support for the mounting assembly 45. Alternatively, the mounting assembly 45 may be a rubber bushing with predetermined spring and damping rates.

The rear portion 23 of the cab 20 is mounted to the frame 15 by two springs 65 and two actuators 25, each preferably spaced adjacent an edge. The springs 65 may be air springs and the actuators 25 may be magnetorheological fluid actuators. Alternatively, various types of springs 65 and actuators 25 may be used such as coil springs and hydraulic actuators. However, the actuators 25 should be capable of being controlled electronically and may be either active or semi-active.

The movement of the cab 20 relative to the frame 15 at the rear portion 23 of the cab 20 is relatively vertical for small magnitude movements as shown by directional arrow B. Therefore, actuators 25 should control the vertical movement of the rear portion 23 of the cab 20 relative to the frame 15.

The position sensor 30 may be mounted on either the cab 20 or the frame 15 and may measure the relative position of the rear portion 23 of the cab 20 relative to the frame 15 and specifically may measure changes in the distance between the rear portion 23 of the cab 20 and the frame 15. The signal generated by the position sensor 30 (i.e., the first signal) may be sent to the electronic control unit 40 where it may be converted into a first velocity signal by taking the first derivative of the position signal. Alternatively, the position sensor 30 may include electronics for converting the position signal into the first velocity signal prior to generating and/or sending the first signal to the electronic control unit 40.

The accelerometer 35 may be positioned on the frame 15 and may measure the acceleration of the frame 15 relative to gravity as the vehicle travels. The signal generated by the accelerometer 35 (i.e., the second signal) may be sent to the electronic control unit 40 where it may be integrated to obtain a second velocity signal. Alternatively, the accelerometer 35 may include electronics for converting the acceleration signal into the second velocity signal prior to generating and/or sending the second signal to the electronic control unit 40.

Various other types of sensors may be substituted for the position sensor 30 and the accelerometer 35. The objective of the position sensor 30 and the accelerometer 35 is to generate velocity signals for use by the electronic control unit 40. Therefore, the position sensor 30 may be substituted by a velocity sensor or accelerometer, both of which are capable of deriving a velocity signal based on movement of the cab 20 relative to the frame 15. The accelerometer 35 on the frame 15 may be substituted for a sensor capable of measuring movement of the frame relative to road conditions.

The electronic control unit 40 may be positioned on the frame, in the cab or in any other convenient location on the truck and may be adapted to receive the first and second signals from the position sensor 30 and the accelerometer 35. As mentioned above, the electronic control unit 40 may be adapted to convert the first signal received from the position sensor 30 into the first velocity signal by a differentiation algorithm and the second signal received from the accelerometer 35 into a second velocity signal by an integration algorithm such that the first and second signals are in the same direction or phase. The electronic control unit 40 may be in communication (e.g., direct wire, radio transmission or other like communication means) with the actuators 25 such that the electronic control unit 40 may generate a first control signal for controlling the actuators 25 based on the first and second velocity signals.

The electronic control unit 40 utilizes a control algorithm to generate the first control signal based on the first and second velocity signals. The control algorithm may be any type of control algorithm such as a PID control algorithm or the like. Specifically, the electronic control unit 40 may subtract the second velocity signal from the first velocity signal to obtain an adjusted velocity signal and the adjusted velocity signal may be used by the control algorithm to generate the first control signal. When the first velocity signal is in phase with the second velocity signal, the subtraction of the second velocity signal from the first velocity signal results in a diminished adjusted velocity signal and therefore less control is required. However, when the first velocity signal is not in phase with the second velocity signal, the subtraction of the second velocity signal from the first velocity signal results in a magnified adjusted velocity signal that corresponds to an increased amount of control and hence a greater amount of control being required by the actuators 25.

The first embodiment of the present invention also provides a method for controlling a truck cab 20 that includes the steps of pivotally mounting the front portion 22 of the cab 20 to a frame 15, as described above, and positioning two actuators 25 at the rear portion 23 of the cab 20. The actuators 25 may be in communication (e.g., direct wire, radio transmission or other like communication means) with the electronic control unit 40. A position sensor 30 may be positioned at the rear portion 23 of the cab 20 and an accelerometer 35 may be placed on the frame 15 of the cab 20. The position sensor 30 may generate a first signal that may be converted into a first velocity signal and the accelerometer 35 may generate a second signal that may be converted into a second velocity signal. The electronic control unit 40 may subtract the second velocity signal from the first velocity signal to obtain an adjusted velocity signal and may generate a first control signal based on the adjusted velocity signal for controlling the actuators 25.

The electronic control unit 40 may be adapted to receive additional signals, such as, for example, a third signal indicating the traveling speed of the truck. The control algorithm of the electronic control unit 40 may be adapted to utilize such additional signals to generate the first control signal that is sent to the actuators 25.

Figure 3:
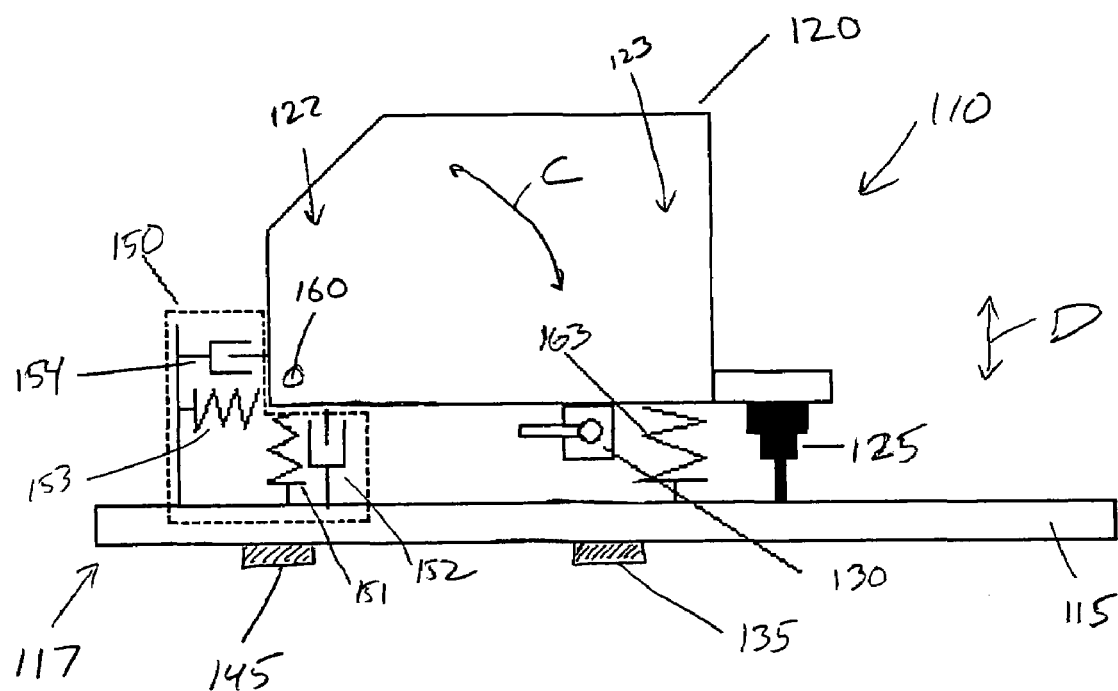
FIG. 3 is a schematic, side elevational view of a second embodiment of the suspension control system of the present invention.
Figure 4:
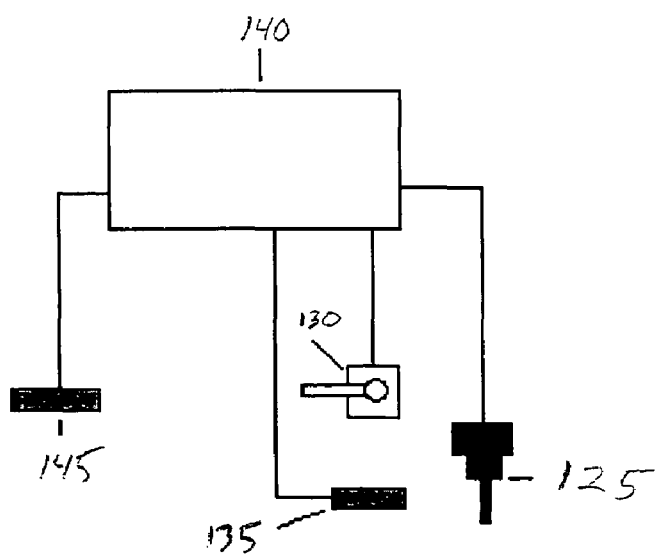
FIG. 4 is a logical schematic of the suspension control system of FIG. 3.

As shown in FIGS. 3 and 4, a second embodiment of the truck cab suspension system, generally designated 100, includes a frame 115, a truck cab 120, two actuators 125 (only one shown), a position sensor 130, a first accelerometer 135, an electronic control unit 140 and a second accelerometer 145 positioned at a front portion 117 of the frame 150.

The truck cab 120 includes a front portion 122 and a rear portion 123. The front portion 122 is pivotally mounted to the frame 115 by a mounting assembly 150. The mounting assembly 150 is positioned along the front portion 122 of the cab 120 and includes two sets of vertical springs 151, two sets of horizontal springs 153, two sets of vertical dampers 152 and two sets of horizontal dampers 154. The mounting assembly 150 connects the cab 120 to the frame 115 at a pivot point 160 such that the cab 120 may pivot about the pivot point 160 in the direction of arrow C. Additional springs 151, 153 and dampers 152, 154 may be positioned along the front portion 122 of the cab 120 to additionally support the mounting assembly 150.

The rear portion 123 of the cab 120 is mounted to the frame 115 by two springs 163 and two actuators 125. The springs 163 may be air springs and the actuators 125 may be magnetorheological fluid actuators. Alternatively, various types of springs 163 and actuators 125 may be used such as coil springs and hydraulic actuators. However, the actuators 125 should be capable of being controlled electronically.

The movement of the cab 120 relative to the frame 115 at the rear portion 123 of the cab 120 is relatively vertical as shown by directional arrow D. Therefore, actuators 125 should control the vertical movement of the rear portion 123 of the cab 120 relative to the frame 115.

The position sensor 130 may be mounted on either the cab 120 or the frame 115 and may measure the relative position of the rear portion 123 of the cab 120 relative to the frame 115 and specifically may measure changes in the distance between the rear portion 123 of the cab 120 and the frame 115. The signal generated by the position sensor 130 (i.e., the first signal) may be sent to the electronic control unit 140 where it may be converted into a first velocity signal by taking the first derivative of the position signal. Alternatively, the position sensor 130 may include electronics for converting the position signal into the first velocity signal prior to generating and/or sending the first signal to the electronic control unit 140.

The first accelerometer 135 may be positioned on the frame 115 and may measure the acceleration of the frame 115 relative to gravity as the vehicle travels. The signal generated by the first accelerometer 135 (i.e., the second signal) may be sent to the electronic control unit 140 where it may be integrated to obtain a second velocity signal. Alternatively, the first accelerometer 135 may include electronics for converting the second signal into the second velocity signal prior to generating and/or sending the second signal to the electronic control unit 40.

The second velocity signal may be subtracted from the first velocity signal to obtain an adjusted velocity signal, and the adjusted velocity signal may be used to generate a first control signal, as described above in the discussion of the first embodiment of the present invention.

The second accelerometer 145 may be positioned at the front portion 117 of the frame 115 near the front portion 122 of the cab 120 to measure the movement (e.g., acceleration) of the front portion 122 of the cab 120 relative to the front portion 117 of the frame 115. The signal generated by the second accelerometer 145 (i.e., the third signal) may be sent to the electronic control unit 140 where it may be integrated to obtain a third velocity signal. Alternatively, the second accelerometer 145 may include electronics for converting the third signal into the third velocity signal prior to generating and/or sending the signal to the electronic control unit 140.

Various other types of sensors may be substituted for the position sensor 130, first accelerometer 135 and second accelerometer 145. The objective of the position sensor 130, first accelerometer 135 and second accelerometer 145 is to generate velocity signals for use by the electronic control unit 140. Therefore, the position sensor 130 and second accelerometer 145 may be substituted for other sensors capable of measuring the movement of the cab 120 relative to the frame 115, such as a position sensor, a velocity sensor or an accelerometer, all of which are capable of deriving a velocity signal based on movement of the cab 120 relative to the frame 115. Furthermore, the accelerometer 135 on the frame 115 may be substituted for a sensor capable of measuring movement of the frame relative to road conditions. An alternative embodiment of the present invention may use a single accelerometer (rather than a first 135 and second 145 accelerometer) placed on the frame 115 for generating both the second and third signals.

The electronic control unit 140 may be positioned on the frame 115, in the cab 120 or in any other convenient location on the truck and may be adapted to receive the first, second and third signals from the position sensor 130, the first accelerometer 135 and the second accelerometer 145. As mentioned above, the electronic control unit 140 may be adapted to convert the first signal received from the position sensor 130 into the first velocity signal by a differentiation algorithm, the second signal received from the first accelerometer 135 into a second velocity signal by an integration algorithm and the third signal received from the second accelerometer 145 into a third velocity signal by an integration algorithm such that the first, second and third signals are in the same dimension or phase (i.e., velocity).

The third velocity signal may be filtered to within a specific preset frequency range using a band pass filter or the like. The frequency range may be selected based on the frequencies of the first and second signals.

The electronic control unit 140 may generate the first control signal based on the first velocity signal, the second velocity signal or the adjusted velocity signal (as discussed above). The electronic control unit 140, or alternatively, a second electronic control unit 140, may generate a second control signal based on the filtered third velocity signal. The electronic control unit(s) 140 may utilize a control algorithm to generate the first and second control signals. The control algorithm may be any type of control algorithm such as a PID control algorithm or the like.

The second control signal generated by the electronic control unit 140 is based on the third velocity signal, which is based on the movement of the front portion 122 of the cab 120 relative to the front portion 117 of the frame 115. However, the front portion 122 of the cab 120 is not mounted to the front portion 117 of the frame 115 by a controllable actuator. Therefore, the second control signal may be used to augment the first control signal to obtain an augmented control signal which controls the rear actuators 125. The augmented control signal is obtained as follows: when the adjusted velocity signal (or, alternatively, the first and/or second velocity signal) is in phase with the third velocity signal, the first control signal is decreased by the second control signal, thereby requiring less control. However, when the adjusted velocity signal (or, alternatively, the first and/or second velocity signal) is not in phase with the third velocity signal, the first control signal is increased by the second control signal, thereby requiring a greater amount of control for compensating for the pitch motion of the cab 120.

The second embodiment of the present invention provides a method for improving damping performance of a truck cab suspension. The method includes the following steps: providing a frame 115 and a cab 120, the cab 120 having at least one front portion 122 pivotally mounted to the frame 115 and a rear portion 123. At least one controlled actuator 125 is provided between the rear portion 123 of the cab 120 and the frame 115 for controlling movement of the rear portion 123 of the cab 120 relative to the frame 115, the at least one controlled actuator 125 is controlled by an augmented control signal based on a first control signal and a second control signal. At least one rear sensor (such as a position sensor 130) is provided for measuring movement of the rear portion 123 of the cab 120 relative to the frame 115, the rear sensor generates a first movement signal that is converted into a first velocity signal and the first control signal is based on the first velocity signal. At least one front sensor (such as accelerometer 145) is provided for measuring movement of the front portion 122 of the cab 120 relative to the frame 115, the front sensor generates a third movement signal that is converted into a third velocity signal and the second control signal is based on the third velocity signal. An electronic control unit 140 determines whether the first velocity signal is in phase with the third velocity signal and the augmented control signal is obtained by either increasing or decreasing the first control signal by the second control signal based on the determining step.

What is claimed is:

1. A method for improving damping performance of a truck cab suspension comprising the steps of:

providing a frame and a cab, said cab having a front portion pivotally mounted to said frame and a rear portion;

providing at least one controlled actuator between said rear portion of said cab and said frame for controlling movement of said rear portion of said cab relative to said frame, said at least one controlled actuator being controlled by an augmented control signal based on a first control signal and a second control signal;

providing at least one rear sensor for measuring movement of said rear portion of said cab relative to said frame, said at least one rear sensor generating a first movement signal;

converting said first movement signal into a first velocity signal;

generating said first control signal based on said first velocity signal;

providing at least one front sensor for measuring movement of said front portion of said cab relative to said frame, said at least one front sensor generating a second movement signal;

converting said second movement signal into a second velocity signal;

generating said second control signal based on said second velocity signal;

determining whether said first velocity signal is in phase with said second velocity signal; and generating said augmented control signal by either increasing said first control signal by said second control signal when said determining step determines that said first velocity signal is not in phase with said second velocity signal or decreasing said first control signal by said second control signal when said determining step determines that said first velocity signal is in phase with said second velocity signal.

2. The method of claim 1 wherein said at least one front sensor is a position sensor for measuring a relative position of said front portion of said cab relative to said frame and said second movement signal includes a position signal.

3. The method of claim 2 wherein said converting said second movement signal step includes differentiating said position signal to obtain said second velocity signal.

4. The method of claim 1 wherein said at least one front sensor is an accelerometer for measuring the acceleration of said front portion of said cab relative to said frame and said second movement signal includes an acceleration signal.

5. The method of claim 4 wherein said converting said second movement signal step includes integrating said acceleration signal to obtain said second velocity signal.

6. The method of claim 1 further comprising the step of filtering said second velocity signal to within a preset range.

* * * * *